US012607043B2

(12) United States Patent
Lai

(10) Patent No.: US 12,607,043 B2
(45) Date of Patent: Apr. 21, 2026

(54) ANTI-PICKING COMBINATION PADLOCK

(71) Applicant: The Sun Lock Company Limited, Tuen Mun (HK)

(72) Inventor: Karl Lai, Tai Po (HK)

(73) Assignee: The Sun Lock Company Limited, Tuen Mun (HK)

( * ) Notice: Subject to any disclaimer, the term of this patent is extended or adjusted under 35 U.S.C. 154(b) by 94 days.

(21) Appl. No.: 18/515,208

(22) Filed: Nov. 20, 2023

(65) Prior Publication Data

US 2024/0247521 A1 Jul. 25, 2024

Related U.S. Application Data

(60) Provisional application No. 63/439,969, filed on Jan. 19, 2023.

(51) Int. Cl.
*E05B 67/22* (2006.01)
*E05B 37/02* (2006.01)

(52) U.S. Cl.
CPC ............ *E05B 67/22* (2013.01); *E05B 37/025* (2013.01)

(58) Field of Classification Search
CPC ........ E05B 37/02; E05B 37/025; E05B 67/06; E05B 67/18; E05B 67/22; E05B 67/02; E05B 67/025
See application file for complete search history.

(56) References Cited

U.S. PATENT DOCUMENTS 3,720,082 A 3/1973 Feinberg et al.
5,125,248 A 6/1992 Ling
5,953,940 A 9/1999 Ling
6,029,481 A 2/2000 Lai
6,035,672 A * 3/2000 Lai ........................ E05B 37/025 70/315
6,176,109 B1 1/2001 Tsui
6,363,758 B1 4/2002 Ling
6,470,718 B1 10/2002 Yang
6,474,116 B1 11/2002 Lai
6,675,614 B2 * 1/2004 Lai ........................ E05B 37/025 70/315

(Continued)

FOREIGN PATENT DOCUMENTS

CN 202672894 1/2013
CN 107013097 A 8/2017

(Continued)

*Primary Examiner* — Christopher J Boswell

(74) *Attorney, Agent, or Firm* — Ware, Fressola, Maguire & Barber LLP

(57) ABSTRACT

A padlock including a lock body, a combination mechanism to control movement of a spindle within the lock body, at least one clutch mounted about the spindle each clutch having at least one extended-fin, and alignment of each of the at least one extended-fin with a corresponding gate in the lock body allows for movement of the spindle within the lock body. The padlock may also include a shackle having a long leg and a short leg, and the padlock is positionable between a locked mode in which the short leg of the shackle is positioned within the body and the movement of the spindle within the lock body is substantially limited, and an unlocked mode in which the short leg of the shackle is spaced apart from the body and movement of the spindle within the lock body is allowed.

17 Claims, 8 Drawing Sheets

(56) References Cited

U.S. PATENT DOCUMENTS

| | | | | |
|---|---|---|---|---|
| 6,729,166 | B1 | 5/2004 | Lai | |
| 6,904,776 | B1 * | 6/2005 | Lin | E05B 37/025 70/284 |
| 7,117,698 | B2 | 10/2006 | Lai | |
| 7,775,073 | B2 * | 8/2010 | Green | E05B 37/025 70/22 |
| 8,353,184 | B2 * | 1/2013 | Ling | E05B 39/00 70/284 |
| 8,511,118 | B2 * | 8/2013 | Lai | E05B 35/105 70/284 |
| 9,556,650 | B1 * | 1/2017 | Lai | E05B 37/0058 |
| 9,803,398 | B2 * | 10/2017 | Lai | E05B 67/24 |
| 11,261,622 | B2 * | 3/2022 | Lai | E05B 37/0058 |
| 2006/0027001 | A1 | 2/2006 | Lai | |
| 2014/0157838 | A1 | 6/2014 | Nave | |
| 2016/0102476 | A1 | 4/2016 | Lai et al. | |
| 2020/0318390 | A1 * | 10/2020 | Bartel | E05B 37/0055 |

FOREIGN PATENT DOCUMENTS

| | | | |
|---|---|---|---|
| CN | 112443203 | A | 3/2021 |
| CN | 215443575 | | 1/2022 |
| CN | 216588122 | | 5/2022 |

* cited by examiner

ANTI-PICKING COMBINATION PADLOCK

CROSS-REFERENCE TO RELATED APPLICATIONS

This application claims priority to U.S. Provisional Appl. No. 63/439,969 filed Jan. 19, 2023, which is hereby incorporated by reference in its entirety.

BACKGROUND OF THE INVENTION

1. Field of the Invention

The present invention generally relates to combination padlocks, and more particularly to a combination padlock having one or more anti-picking features.

2. Related Art

The combination padlock discussed in U.S. Pat. No. 7,117,698, entitled High Security Padlock Construction, which is hereby incorporated by reference in its entirety, is one of the most secure mid-size combination padlocks. However, the combination padlock discussed in U.S. Pat. No. 7,117,698 contains an extended fin longer than the other two extended fins. The longer extended fin creates a false clicking sound and feedback to an intruder attempting unauthorized opening of the combination padlock. The clicking sound and feedback allow the intruder to reduce the number of digits the intruder has to determine from 10 down to 3. This reduces the amount of picking time required for an intruder to gain unauthorized opening of the combination padlock, since the intruder has less digits to overcome during their unauthorized manipulation of the combination padlock.

Therefore, what is needed is a mid-sized padlock having anti-picking features to reduce and/or eliminate the likelihood an intruder can gain unauthorized access to the padlock.

SUMMARY OF THE INVENTION

An exemplary embodiment of the present invention is a padlock containing a set of clutches designed to minimize the padlock from being picked and/or decoded. The set of clutches may be three clutches having the same length, and incorporating an edge positioned at greater or lesser than 90 degrees, for example a rounded edge or a slope edge, to swiftly slide through false gates and/or incorrectly aligned gates of the lock body when an extended fin of the clutch having the edge contacts a false gates. This configuration increases the picking and/or decoding time as the unauthorized user will not able to feel or hear the true gates or false gates easily, which makes it more difficult to determine the correct lock open code, i.e., the combination, of the padlock.

An object of the present invention is to provide a padlock in which the feedback provided by the padlock to an unauthorized user attempting to determine the correct lock open code is reduced and/or eliminated.

It is another object of the present invention to provide a padlock having at least one bolt with two different radii so as to reduce the lock opening travel distance, and thereby the overall size of the padlock.

It is still another object of the present invention to provide a padlock having at least one bolt having a slope formed thereon so as to receive a slope of a cam, so that in an unlocked mode of the padlock, the slope of the bolt facilitates movement of the cam from the unlocked mode to a locked mode of the padlock.

It is yet another object of the present invention to provide a padlock containing one or more clutches, and each of the clutches have three extended-fins all with at least substantially the same lengths so as to provide increased anti-picking and/or anti-decoding functionality.

It is another object of the present invention to provide a padlock having a body containing one gate for each of the extended-fins, and configured for alignment with the extended-fins of the clutches for positioning the padlock in the unlocked mode and a reset mode.

It is still another object of the present invention to provide a padlock having rounded edges on the extended-fins so as to slide non-aligned extended-fins away from gates of the lock body that do not correspond with the non-aligned extended-fins.

It is still another object of the present invention to provide a padlock having sloped edges on the extended-fins so as to slide non-aligned extended-fins away from gates of the lock body that do not correspond with the non-aligned extended-fins.

It is yet another object of the present invention to provide a padlock having a cam with a slope formed thereon, and configured to cause movement of a bolt of the padlock from the unlocked mode to the locked mode.

It is another object of the present invention to provide a padlock having a cam plug retainer peg to retain a cam plug within the body of the padlock so that the cam plug is not pushed out of the body by a cam spring.

It is still another object of the present invention to provide a padlock having clutches positioned in the unlocked mode of the padlock so that the extended-fins of the clutches are engaged with the gates of the body and the teeth of the dials associated with the clutches so that the dials cannot be turned and the correct lock open code lost.

It is yet another object of the present invention to provide a padlock having a bolt with two different dimensions, where a bigger radius of the bolt is configured for engagement of a cutout of a shackle of the padlock to retain the shackle within the body of the padlock, and where a smaller radius of the bolt is configured for engagement with a lock surface of a cam in order to inhibit movement of the bolt within the body of the padlock.

It is still another object of the present invention to provide a padlock having a bolt made from two separate portions where each of the portions may be mated together to form a single bolt.

It is another object of the present invention to provide a padlock having an anti-stop rotation feature created by the rounded edges and/or sloped edges of extended-fins the clutches not creating a clicking sound or other audible feedback and/or not creating a stopping effect when in contact with false gates and/or gates not corresponding to the particular extended-fin, thereby preventing an unauthorized user from determining the locations of the gates.

It is yet another object of the present invention to provide a padlock having a lock body with three correct corresponding gates for each clutch, and each clutch includes three extended-fins, each extended-fin having a corresponding gate.

It is still another object of the present invention to provide a padlock such that the angle position of each extended-fin will align with the corresponding gate at only one time for a full 360 degree rotation of the dial.

It is another object of the present invention to provide a padlock having at least one bolt which has radii of two different sizes to provide for the maximum locking strength in the smallest space and least working length.

It will thus be seen that these and other objects can be obtained by a padlock according to an exemplary aspect of the present invention including a body having at least one dial slot and at least one gate formed in the body and positioned adjacent to the at least one dial slot, at least one clutch disposed within the body, and each of the at least one clutch having at least one extended-fin, and a spindle extending through each of the at least one clutch, where each of the at least one clutch is configured for rotation about the spindle, where each of the at least one extended-fin has a corresponding gate of the at least one gate so that alignment of each of the at least one extended-fin with the corresponding gate allows for rectilinear movement within the body of each of the at least one extended-fin into the corresponding gate, and where each of the at least one extended-fin includes a pair of substantially parallel sides and an upper surface and a lower surface positioned adjacent to the parallel sides, and the upper surface and lower surface intersect with each of the parallel sides at angles less than or greater than 90 degrees.

According to this and other exemplary aspects of the present invention, the padlock further includes a dial for each of the at least one clutch, each dial includes teeth configured for engagement with the at least one extended-fin so that rotation of the dial is transferred to rotation of the at least one clutch about the spindle, a shackle having a long leg and a short leg, at least the long leg or the short leg includes a cutout formed therein, a bolt positioned within the body and configured for engagement with the cutout, a cam operatively coupled to the spindle such that movement of the spindle is transferred to the cam, the padlock is positionable between a locked mode in which the short leg of the shackle is positioned within the body and the bolt is engaged with the cutout, and an unlocked mode in which the short leg of the shackle is spaced apart from the body and the bolt is disengaged from the cutout.

According to this and other exemplary aspects of the present invention, at least one of the upper surface and the lower surface of at least one of the at least one extended-fin includes a rounded edge.

According to this and other exemplary aspects of the present invention, at least one of the upper surface and the lower surface of at least one of the at least one extended-fin includes a slope.

According to this and other exemplary aspects of the present invention, each of the at least one clutch includes three extended-fins, and the three extended-fins are positioned about the at least one clutch such that no more than one extended-fin is aligned with the at least one gate unless all of the three extended-fins are aligned with the corresponding gate for each of the three extended-fins.

According to this and other exemplary aspects of the present invention, each of the dials include one or more indicia visible thereon, and the padlock is configured to be positioned in the unlocked mode when a preset correct lock open code comprised of one indicia from each of the dials is aligned on all of the dials.

According to this and other exemplary aspects of the present invention, the spindle includes a top, and the cam includes a lock surface, an opening neck and a cam slope connecting the lock surface with the opening neck, a cam spring biases the cam in a direction towards the top of the spindle.

According to this and other exemplary aspects of the present invention, the bolt includes a first radius configured for engagement with the cutout of the shackle, and a second radius smaller than the first radius and configured for engagement with the lock surface of the cam.

According to this and other exemplary aspects of the present invention, the bolt includes a bolt slope positioned between the second radius and the first radius, and configured for engagement with the cam slope during movement of the padlock between the unlocked mode and the locked mode.

According to this and other exemplary aspects of the present invention, the bolt comprises a first portion having a first radius and a second portion having a second radius, the first portion is configured to be mated with the second portion to form the bolt.

According to this and other exemplary aspects of the present invention, each of the short leg and the long leg of the shackle include a cutout formed therein, and the padlock includes a second bolt positioned in the body and configured for engagement with the cutout formed on the short leg or the cutout formed on the long leg.

According to this and other exemplary aspects of the present invention, when each of the at least one extended-fin has been moved into the corresponding gate for each of the at least one extended-fin, the engagement of each of the at least one extended-fin with the corresponding gate inhibits rotation of the at least one clutch about the spindle and rotation of each dial as a result of engagement between the teeth of the dial and the corresponding extended-fins.

According to this and other exemplary aspects of the present invention, when the padlock is positioned in the unlocked mode the spindle is configured for rectilinear movement within the body away from the cam disengaging each of the at least one extended-fin from the corresponding teeth of each of the dial to position the padlock in a reset mode, in the reset mode rotational movement of each dial is not transferred to rotational movement of the corresponding clutch, and a new correct lock open code comprised of one indicia from each of the dials can be aligned the dials.

According to this and other exemplary aspects of the present invention, movement of the bolt between the locked mode and unlocked mode of the padlock is substantially perpendicular to movement of the cam between the locked mode and unlocked mode of the padlock.

According to this and other exemplary aspects of the present invention, the spindle includes a button affixed to an end of the spindle opposite the top and positioned outside of the body of the padlock, movement of the button in a direction towards the body of the padlock compresses the cam spring in the unlocked mode of the padlock.

According to this and other exemplary aspects of the present invention, the padlock includes a cam plug fit into the body of the padlock and configured to position the cam spring between the cam and the cam plug.

According to this and other exemplary aspects of the present invention, the padlock includes at least one cam plug retainer peg positioned in the cam plug and the body and configured to retain the cam plug in the body of the padlock.

The exemplary aspects of the present invention discussed are merely exemplary, and it is understood the present invention is not limited to any particular aspects or combinations thereof. Rather, the present invention encompasses both individual elements of the exemplary aspects alone, and in combination with any other individual elements whether or not specifically recited as an exemplary aspect.

The reference numbers and corresponding elements are summarized below:

| | |
|---|---|
| 10: Padlock | |
| 20: Body | |
| 21: Short leg shackle hole | |
| 22: Long Leg Shackle hole | |
| 23: Cam Hole | |
| 24: Bolt Hole | |
| 25: Gates | |
| 26: Dial Slot | |
| 27: Ratchet Spring Holes | |
| 28: Push Button recess | |
| 29: Bolt Covering Hole | |
| 20a: Shackle Retain peg hole | |
| 20b: Cam plug retaining peg hole | |
| 20c: Sealing Plug hole | |
| 30: Shackle | |
| 31: Short Leg Shackle | |
| 32: Long Leg Shackle | |
| 33: Cutout | |
| 34: Shackle retaining slot | |
| 35: Neck | |
| 40: Bolt | |
| 41: Big Radius | |
| 42: Small Radius | |
| 43: Slope | |
| 50: Cam | |
| 51: Lock Surface | |
| 52: Opening neck | |
| 53: Slope | |
| 54: Spring Hole | |
| 60: Spindle | |
| 61: Top | |
| 62: Flat bottom | |
| 63: Neck | |
| 64: Tail | |
| 70: Button | |
| 71: Hole | |
| 80: Clutch | |
| 81: Hole | |
| 82: Extended-Fin | |
| 83: Rounded edge | |
| 84: Parallel sides | |
| 90: Dial | |
| 91: Teeth | |
| 100: Cam Plug | |
| 101: Spring Hole | |
| 110: Sealing Plug | |
| 111: Hole | |
| 120: Ratchet pin hole plug | |
| 130: Ratchet Pin | |
| 140: Shackle Retain peg | |
| 150: Cam plug retainer peg | |
| 160: Bolt cover | |
| 170: Shackle Spring | |
| 180: Ratchet Spring | |
| 190: Cam Spring | |
| 200: Reset Spring | |
| 210: Second Embodiment Clutch | |
| 211: Hole | |
| 212: Extended-fin | |
| 213: Slope | |
| 214: Parallel Sides | |
| 220: C-Clip | |
| 230: Secondary Big Radius Bolt | |
| 231: Big Radius | |
| 232: Mate Surface | |
| 240: Secondary Slope Bolt | |
| 241: Small Radius | |
| 242: Slope | |
| 243: Mate Surface | |

BRIEF DESCRIPTION OF THE DRAWINGS

For a fuller understanding of the nature and object of the present invention, reference should be had to the following detailed description taken in connection with the accompanying drawings, in which.

DETAILED DESCRIPTION

Figure 1A:
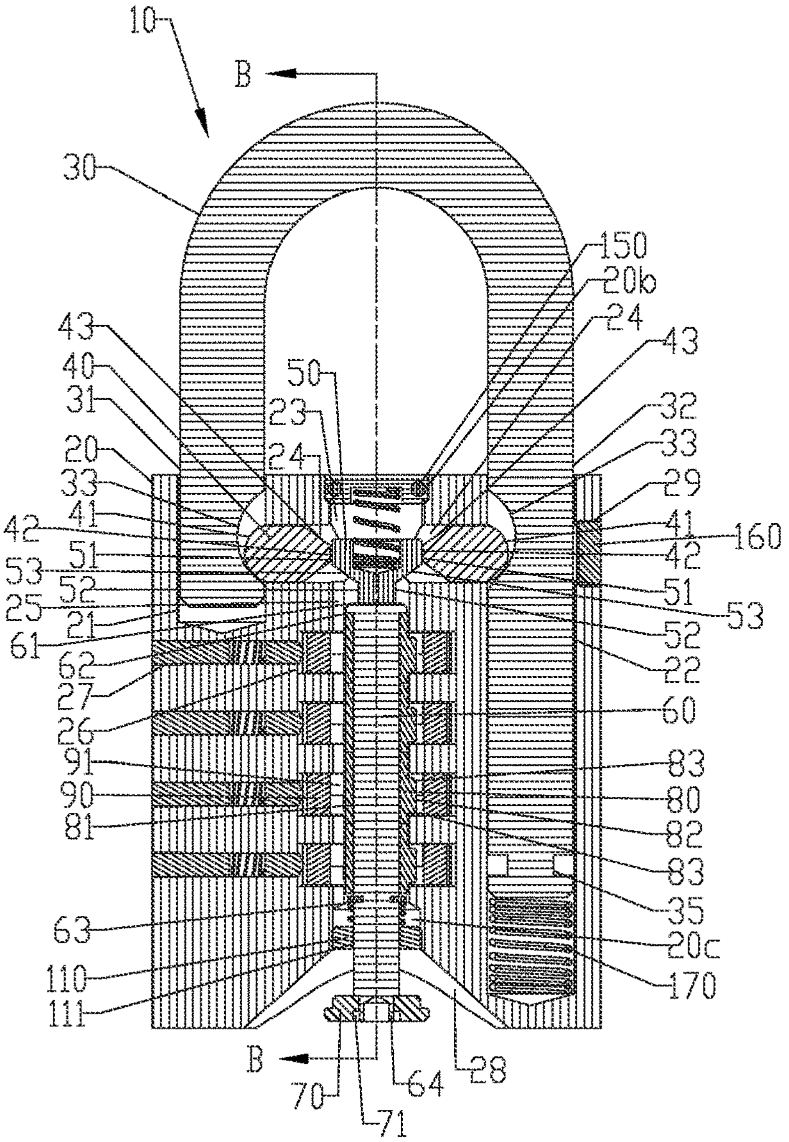
FIG. 1A is a cross-sectional view of an exemplary padlock according to an aspect of the invention in a locked mode taken along line A-A from FIG. 1B.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 1A-1C, 2, 13A-13C and 14A-14C, therein illustrated is an exemplary padlock, generally indicated by reference numeral 10, according to an aspect of the present invention. The padlock 10 may include a body 20 having a short leg shackle hole 21 and a long leg shackle hole 22 formed therein. A shackle retain peg hole 20*a* may also be formed in the body 20, and at least partially intersecting the long leg shackle hole 22. The body 20 may also include a cam hole 23 and a bolt hole 24 positioned so at least to partially intersect the cam hole 23. The body 20 may also include one or more cam plug retaining peg holes 20*b* positioned so as to at least partially intersect with the cam hole 23. The bolt hole 24 may also be positioned within the body 20 to at least partially intersect either or both the short leg shackle hole 21 and/or the long leg shackle hole 22. The body 20 of the padlock 10 may also include one or more dial slots 26 formed in the body 20. The one or more dial slots 26 may extend through the body 20, or be only open to one side of the body 20. Each of the one or more dial slots 26 may be intersected by a ratchet spring hole 27 positioned in the body 20. The body 20 may further include one or more gates 25 positioned between, above and/or below the dial slots 26. An exterior surface of the body 20 may include a push button recess 28 formed therein, and a sealing plug hole 20*c* may also be formed in the body 20 adjacent to the push button recess 28. The body 20 may also include a bolt covering hole 29 formed in the body 20 and at least partially intersecting with the long leg shackle hole 22.

Referring now to FIGS. 1A-1C, 2-3, 13A-13C and 14A-14C, the padlock 10 may include a shackle 30 having a short leg shackle 31 and a long leg shackle 32. The short leg shackle 31 may be dimensioned and disposed so at to have a cooperating relationship with the short leg shackle hole 21 of the body 20, by which relationship the short legal shackle 31 may be at least partially positioned within the short leg shackle hole 21. The long leg shackle 32 may be dimensioned and disposed so as to have a cooperating relationship with the long leg shackle hole 22 of the body 20, by which relationship the long leg shackle 32 may be at least partially positioned within the long leg shackle hole 22. The shackle 30 may also include a cutout 33 on the short leg shackle 31 and/or the long leg shackle 32. The shackle 30 may further include a shackle retaining slot 34 formed on the long leg shackle 32, and a neck 35 formed by a reduction in diameter of the long leg shackle 32. Accordingly, the neck 35 will be positioned on the long leg shackle 32 such that the diameter of the long leg shackle 32 will be greater than the diameter of the neck 35.

Referring now to FIGS. 1A-1C, 4, 13A-13C and 14A-14C, the padlock 10 may also include one or more bolts 40 positioned within the body 20 and configured for engagement with the cutouts 33 of the short leg shackle 31 and/or the long leg shackle 32. If more than one bolt 40 is positioned in the body 20, one bolt 40 may be positioned for engagement with the cutout 33 of the short leg shackle 31, and the other bolt 40 may be positioned for engagement with the cutout of the long leg shackle 32. The bolt 40 includes a first end having a big radius 41, and a second end having a small radius 42. It is understood for the purposes of the present invention the terms "big" and "small" are used for reference relative to each other, and the big radius 41 and the small radius 42 are not limited to any particular sizes as a result of the use of the terms "big" and "small". In other words, the big radius 41 is of a size having a radius larger than the radius of the small radius 42, and conversely, the small radius 42 is of a size having a radius less than the radius of the large radius 41. The bolt 40 may also include a slope 43 formed between the diameter of the big radius 41 and the diameter of the small radius 42.

Referring now to FIGS. 1A-1C, 5, 10, 13A-13C and 14A-14C, the padlock 10 may also include cam 50 positioned within the body 20 and configured for operative engagement with the one or more bolts 40. The cam 50 may be constructed to have a substantially cylindrical portion that forms a lock surface 51. The cam 50 may also include an opening neck 52 that has a diameter smaller than the lock surface 51. Positioned between the opening neck 52 and the lock surface 51 may be a slope 54 providing a transition between the larger diameter lock surface 51 and the smaller diameter opening neck 52. The cam 50 may further include a spring hole 54 configured for receipt of a cam spring 190 configured to urge the cam 50 in a downward direction along the body 20. The cam 50 and the cam spring 190 may be retained in the body 20 by a cam plug 100 positioned over the cam hole 23 and retained within the body 20 by one or more cam plug retainer pegs 150 inserted into the one or more cam plug retaining peg holes 20*b*. The cam plug 100 may include a spring hole 101 formed therein and configured for receipt of the cam spring 190. The cam spring 190 is retained by the cam plug 100 such that the cam spring 190 acts on the cam 50 to urge the cam 50 into the cam hole 23.

Figure 1B:
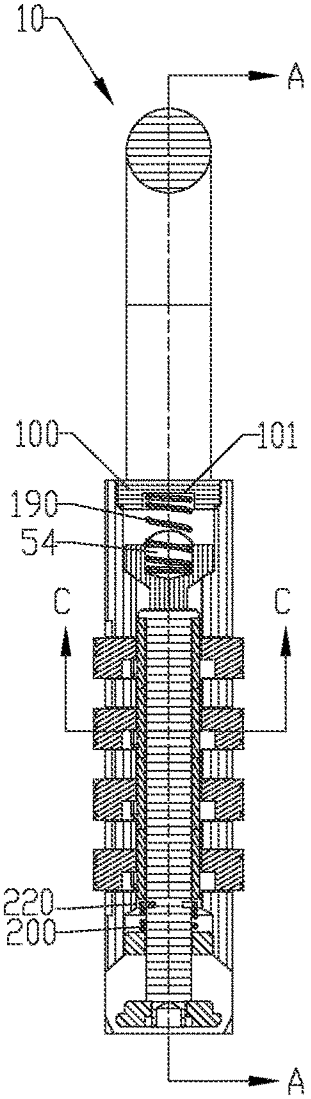
FIG. 1B is a cross-sectional view of the exemplary padlock taken along line B-B from FIG. 1A.
Figure 1C:
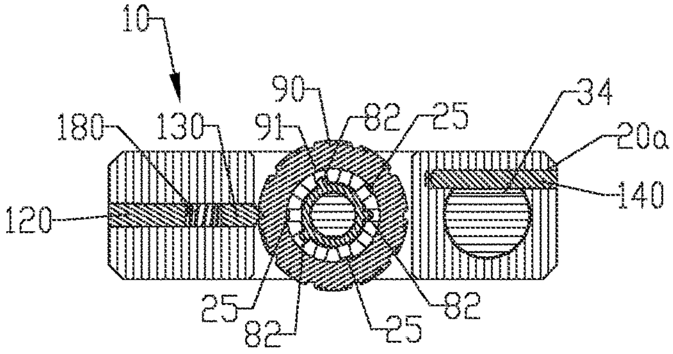
FIG. 1C is a cross-sectional view of the exemplary padlock taken along line C-C from FIG. 1B.
Figure 2:
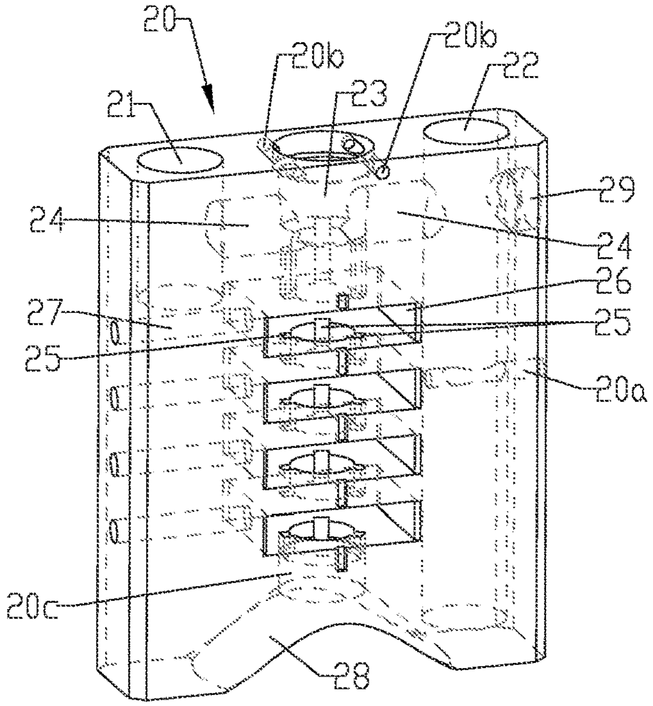
FIG. 2 is a perspective view of an exemplary lock body that may be used with the exemplary padlock according to an aspect of the present invention.
Figure 3:
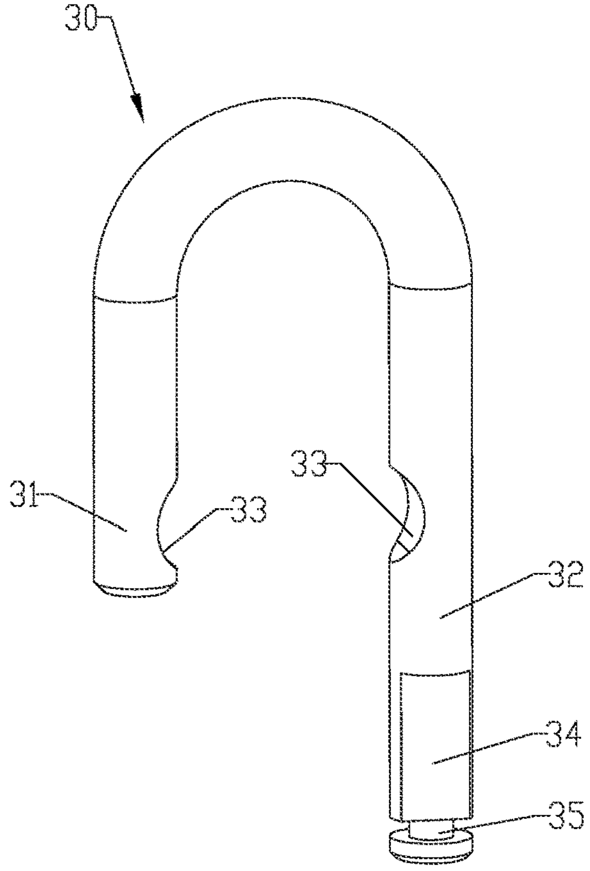
FIG. 3 is a perspective view of an exemplary shackle that may be used with the exemplary padlock according to an aspect of the present invention.
Figure 4:
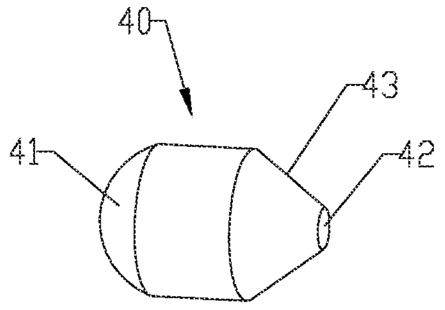
FIG. 4 is a perspective view of an exemplary bolt that may be used with the exemplary padlock according to an aspect of the present invention.
Figure 5:
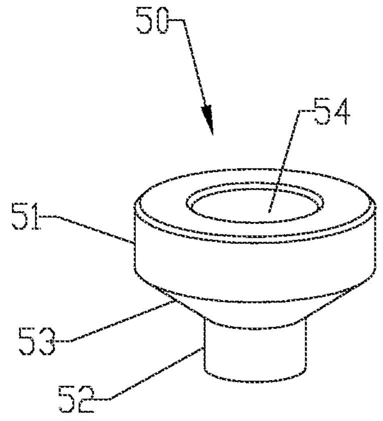
FIG. 5 is a perspective view of an exemplary cam that may be used with the exemplary padlock according to an aspect of the present invention.
Figure 6:
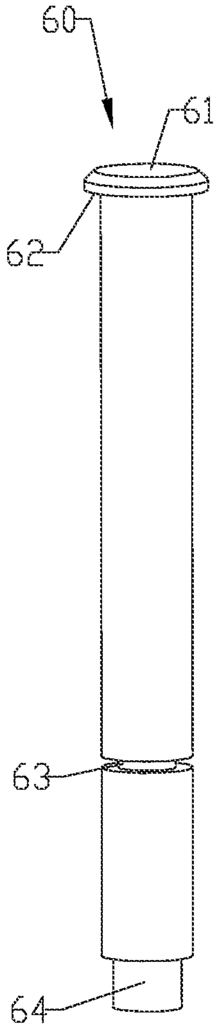
FIG. 6 is a perspective view of an exemplary spindle that may be used with the exemplary padlock according to an aspect of the present invention.
Figure 7:
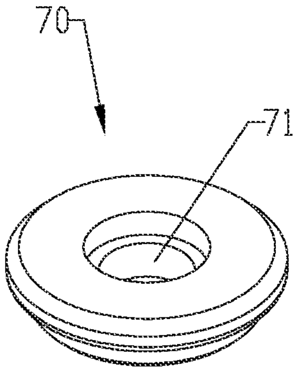
FIG. 7 is a perspective view of an exemplary button that may be used with the exemplary padlock according to an aspect of the present invention.
Figure 8:
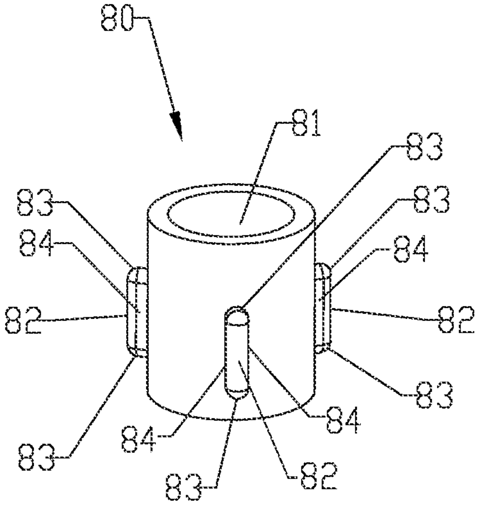
FIG. 8 is a perspective view of an exemplary clutch that may be used with the exemplary padlock according to an aspect of the present invention.
Figure 9:
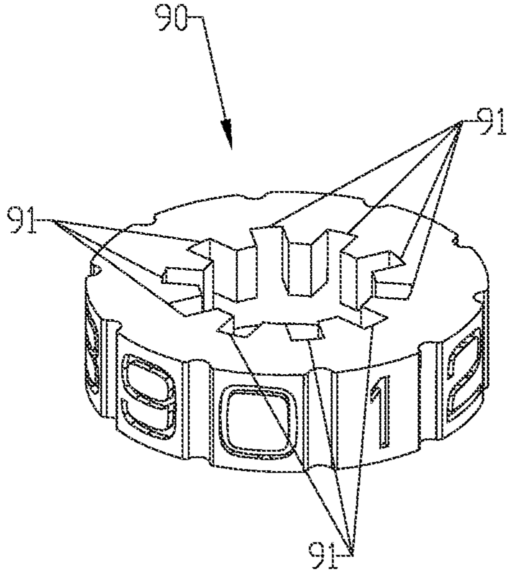
FIG. 9 is a perspective view of an exemplary dial that may be used with the exemplary padlock according to an aspect of the present invention.
Figure 10:
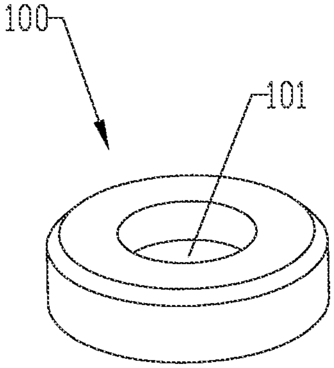
FIG. 10 is a perspective view of an exemplary cam plug that may be used with the exemplary padlock according to an aspect of the present invention.
Figure 11:
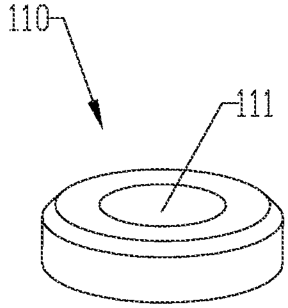
FIG. 11 is a perspective view of an exemplary sealing plug that may be used with the exemplary padlock according to an aspect of the present invention.

Referring now to FIGS. 1A-1C. 6-7, 11, 13A-13C and 14A-14C, the padlock 10 may also include a spindle 60 positioned within the body 20 and oriented so as to extend from the push button recess 28 to the cam hole 23. The spindle 60 may pass through the one or more dial slots 26, and be positioned at least substantially parallel to the one or more gates 25. The spindle may include a top 61 positioned at one end of the spindle 60. The top 61 may include a flat bottom 62 extending circumferentially from the top 61 such that the top 61 has a larger diameter than the spindle 60. The spindle 60 may also include a neck 63 formed in the spindle 60, where the neck 63 has a smaller diameter than the diameter of the spindle 60. The neck 63 is configured to receive a C-clip 220, which C-clip 220 has a diameter larger than the diameter of the spindle 60 so that the C-clip 220 extends past the perimeter of the spindle 60 in order to control and/or retain movement of the spindle 60 within the body 20. The spindle 60 may further include a tail 64 positioned at an end of the spindle 60 opposite the top 61 of the spindle 60. The tail 64 may be configured so as to receive a button 70 onto the spindle 60. The button 70 may include a hole 71 formed therein, and configured to engage with the tail 64 of the spindle 60. The tail 64 of the spindle 60 has a diameter smaller than the spindle 60 so that the button 70 does not slide along the length of the spindle 60, but rather is retained around the tail 64. The spindle 60 may be retained within the body 20 by a sealing plug 110 placed in the sealing plug hole 20*c* adjacent to the push button recess 28. The sealing plug 110 may have a hole 111 formed therein that allows passage of the spindle 60, but the diameter of the hole 111 is smaller than the diameter of the C-clip 220 and the hole 71 of the button 70 such that the movement of the spindle 60 may be constrained between the C-clip 220 and the button 70. A reset spring 200 may be positioned between the C-clip 220 and the sealing plug 110*a* so as to act upon the C-clip 220 and urge the spindle 60 in a direction towards the cam 50.

Referring now to FIGS. 1A-1C, 8-9, 13A-13C and 14A-14C, the padlock 10 may also include one or more clutches 80 positioned within the body 20. Each of the one or more clutches 80 may include a hole 81 formed therein and configured to allow the spindle 60 to pass through the clutch 80, and allow the one or more clutches to rotate about the spindle 60. Each of the one or more clutches 80 may further include one or more extended-fins 82, which are spaced apart around the perimeter of each clutch 80 such that only one orientation of the clutch 80 allows passage of the extended-fins 82 through the corresponding gates 25 in the body 20. For example, as shown in the exemplary embodiment of the clutch 80 illustrated in the figures, the clutch 80 includes three extended-fins 82, and these extended-fins 82 are positioned around the perimeter of the clutch 80 to align with all of the corresponding gates 25 only once during a full 360 degree rotation of the clutch 80 about the spindle 60. The body 20 may contain three true gates 25 for each clutch 80, and the clutches 80 each contain a total of three extended-fins 82. However, it is understood that while this exemplary embodiment may illustrate an advantageous aspect of the present invention, the present invention is not limited to the number and/or spacing of the extended-fins 82 around each of the one or more clutches 80. The extended-fins 82 are formed from a pair of substantially parallel sides 84 and an upper surface and a lower surface positioned above and below the parallel sides 84. The the upper surface and lower surface intersect with each of the parallel sides 84 at angles less than or greater than 90 degrees. The upper surface and lower surface of the one or more extended-fins 82 may be formed from a rounded edge 83. The rounded edges 83 provide a smooth transition from the upper and/or lower surfaces of the extended-fins 82 to the parallel sides 84 of the extended-fins 82. When one of the extended-fins 82 falls into a gate 25 which is not aligned to its corresponding correct angle of true gate 25, the clutch 80 will not move rectilinearly within the body 20 of the padlock 10. Instead, the extended-fin 82 aligns to the other two gates 25 which the rounded edge 83 of the extended fin 82 will swiftly let the extended-fin 82 slide through without producing any clicking sound to allow an unauthorized user of the padlock 10 feel the true gate 25 of a correct lock open code for the padlock 10.

Still referring to FIGS. 1A-1C, 8-9, 13A-13C and 14A-14C, the padlock 10 may further include one or more dials 90 for each of the one or more clutches 80. The dials 90 are disposed around the spindle 60 and positioned in each of the dial slots 26 of the body 20. The dials 90 may have teeth 91 positioned along an interior perimeter of the dials 90, which teeth 91 are configured for engagement with the one or more extended-fins 82 of the clutches 80 so that rotation of the dials 90 around the spindle 60 results in corresponding rotation of the clutches 80 about the spindle 60. The extended-fins 82 are assembled in the teeth 91 of the dial 90 so that turning of dials 90 will turn the clutch 80 and the extended-fins 82 in the same manner. The extended-fins 82 of the clutch 80 have a construction such that the angle position of each extended fin 82 will position to the three true gates 25 at only one time for a full rotation of the dial 90. The turning of the extended-fins 82 in the not correct angular gate 25 will result in the rounded-edge 83 of the extended-fin 82 to slide off the gate 25 to yield a non-clicking sound without letting an unauthorized user of the padlock 10 notice there is a gate 25. Such anti-stop rotating feature is created by the rounded edge 83 of the clutch 80 to non-correct angular true gates 25 to create a non clicking sound and non-stopping effect to thereby prevent an unauthorized user of the padlock 10 from noticing the location of the gate 25. Each of the dials 90 has one or more indicia, which may be in the form of numbers, symbols, letters, colors or the like, corresponding to each tooth of the teeth 91. For example, in the exemplary embodiment illustrated ten indicia in the form of the numbers 0-9 are illustrated, and each of the dials 90 have ten teeth 91. In order to limit free spinning of the dials 90 and clutches 80, each of the dials 90 may be engaged with a ratchet pin 130 that is urged in the direction of the dial 90 by a ratchet spring 180. The ratchet pins 130 and ratchet springs 180 may be retained in the ratchet spring holes 27 of the body 20 by ratchet pin hole plugs 120.

Referring now to FIGS. 1A, 2-3, 13A and 14A, the padlock 10 may also include a bolt cover 160 positioned in the bolt covering hole 29. The bolt cover 160 is configured to limit and/or prevent access to the long leg shackle 32 and/or the bolt hole 24. The padlock 10 may also include a shackle spring 170 positioned within the long leg shackle hole 22, and configured to urge the long leg shackle 32 in a direction away from the body 20 of the padlock 10. The shackle spring 170 urges the long leg shackle 32 in a direction so that movement of the long leg shackle 32 out of the body 20 is inhibited by the engagement of the big radius 41 of the bolt 40 with the cutout 33 on the long leg shackle 32 and/or the cutout 33 on the short leg shackle 31. When the big radius 41 of the bolt 40 is engaged with the cutout 33 on the long leg shackle 32 and/or the cutout 33 on the short leg shackle 31, the padlock 10 is in a locked mode in which the short leg shackle 31 is retained within the body 20 of the padlock 10. When the big radius 41 of the bolt 40 is disengaged with the cutout 33 on both the long leg shackle 32 and the short leg shackle 31, the padlock 10 is in an unlocked mode in which the short leg shackle 31 is urged out of the body 20 as a result of the shackle spring 170 acting upon the long leg shackle 32.

Figure 12:
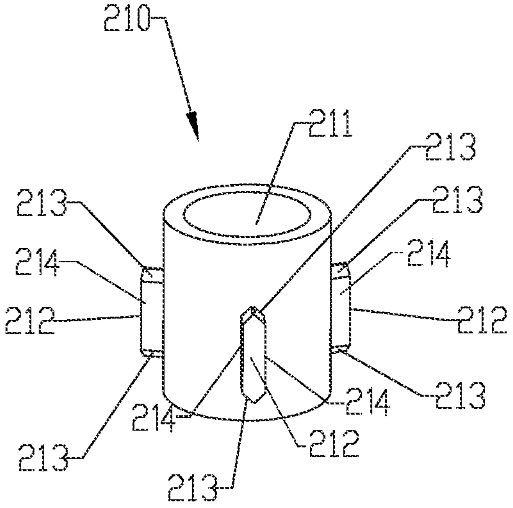
FIG. 12 is a perspective view of an exemplary alternative clutch that may be used with the exemplary padlock according to an aspect of the present invention.

Referring now to FIG. 12, an alternative embodiment of a clutch 210 for use in connection with the padlock 10 is therein illustrated. It is contemplated that the padlock 10 may include a combination of embodiments of clutches 80 and 210, or all of one embodiment of clutches 80 and 210. The clutch 210 includes a hole 211 formed therein, and configured for receipt of the spindle 60 so that the clutch 210 may rotate about the spindle 60 and control the movement of the spindle 60 within the body 20 of the padlock 10. The clutch 210 may also include one or more extended-fins 212 disposed around the clutch 211. The extended-fins 212 are formed from a pair of substantially parallel sides 214 and an upper surface and a lower surface positioned above and below the parallel sides 214. The the upper surface and lower surface intersect with each of the parallel sides 214 at angles less than or greater than 90 degrees. Each the extended-fins 212 may include a slope 213 formed on an upper and/or lower surface of the extended-fins 212. The slope 213 is configured such that when one of the extended-fins 212 are aligned with a non-correct angular gate 25 the extended-fin 212 does not produce a clicking sound that would alert an unauthorized user of the padlock 10 as to the location of the gate 25. Instead, the slope 213 provides for a smooth transition as the extended-fin 212 engages with the non-correct angular gate 25. The extended-fins 212 are configured to engage with the teeth 91 of the corresponding dial 90 so that rotation of the corresponding dial 90 is imparted to the corresponding clutch 210.

Figure 15B:
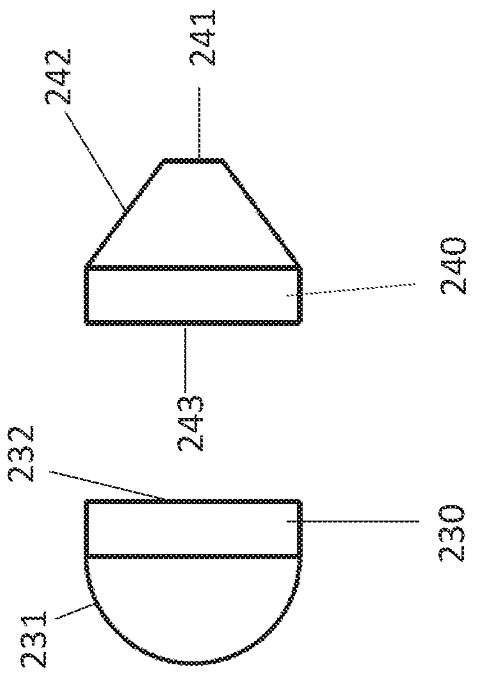
FIG. 15B is an exploded side view of the exemplary alternative bolt.
Figure 15A:
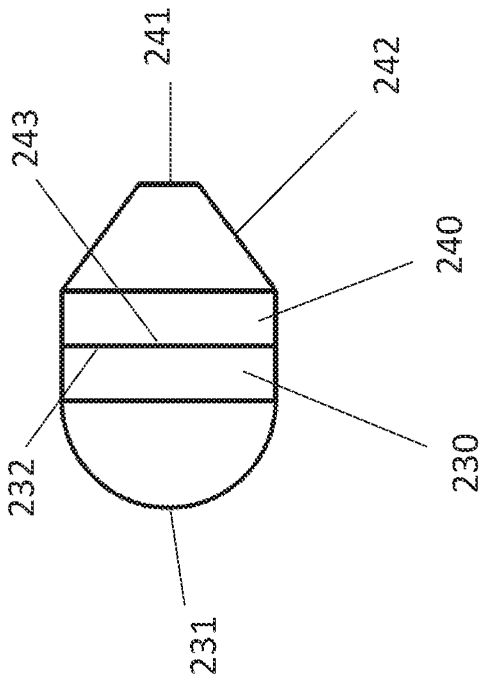
FIG. 15A is a side view of an exemplary alternative bolt that may be used with the exemplary padlock according to an aspect of the present invention.

Referring now to FIGS. 15A and 15B, an alternative embodiment of a bolt composed of a secondary big radius bolt 230 and a secondary slope bolt 240 is illustrated. The padlock 10 is configured to use the secondary big radius bolt 230 and the secondary slope bolt 240 in place of the bolts 40. The secondary big radius bolt 230 includes a big radius 231 that is configured for engagement with the cutouts 33 of the short leg shackle 31 and/or long leg shackle 32. The secondary slope bolt 240 may include a small radius 241 and slope 242 configured for engagement with the cam 50. Both the secondary big radius bolt 230 and the secondary slope bolt 240 include mate surfaces 232, 243 by which the secondary big radius bolt 230 and secondary slope bolt 240 are engaged with each other.

Referring now to FIGS. 1A-1C and 2-12, the locked mode of the padlock 10 will be discussed. Each dial of the dials 90 of the padlock 10 are positioned in a corresponding dial slot 26 of the body 20. The bolt 40 is positioned in the bolt hole 24 of the body 20. The bigger radius 41 of each of the bolts 40 are engaged into cutouts 33 of the shackle 30, and the small radius 42 are aligned with and in operable contact with the lock surface 51 of the cam 50. The cam spring 190 pushes the cam 50 downward such that the opening neck 52 will not align to the small radius 42 which will maintain the padlock 10 in the locked mode. The opening neck 52 of the cam 50 is contacted with top 61 of spindle 60 so as to push the spindle 60 downward in the locked mode. Each of the clutches 80 are assembled into the spindle 60 by passing the spindle 60 through the hole 81 of each clutch 80. The stack of clutches 80 are positioned from the flat bottom 62 of the spindle 60 to the neck 63 of the spindle 60. The C-clip 220 placed into the neck 63 firmly holds the stack of clutches 80 in place without allowing the stack of clutches 80 to drop out of the padlock 80. The clutches 80 each contain at least one extended-fin 83 which is placed in the teeth 91 of the dial 90. With the extended-fins 83 engaged with the teeth 91, the rotation of the dial 90 will fully transfer to the clutch 80 in the locked mode. The spindle 60 is positioned within the hole 111 of the cam plug 110, and the cam plug 110 is press fit into the cam hole 23 of the body 20. As the cam spring 190 has a high exert force, once the cam plug is fitted in the hole 23, two cam plug retaining peg holes 20*b* may be drilled, and each fitted with the cam plug retainer pegs 150 to secure the cam plug 100 in the body 20. Otherwise, the cam plug 100 will be urged away from the body 20 as a result of the cam spring 190 acting upon the cam plug 100. The reset spring 200 positioned between the C-clip 220 and the sealing plug 110 urges the spindle 60 upward in the direction of the cam 50 in the locked mode. The push button recess 28 of the body 20 allows the user easily to reach button 70 for operation of the padlock 10.

Still referring to FIGS. 1A-1C and 2-12, the tail 64 of the spindle 60 is inserted into the hole 71 of the button 70 so that once the spindle 60 has been assembled with the button 70 the spindle 60 and the button 70 act together. The ratchet pins 130 are urged by the ratchet springs 180 to provide for a ratchet feeling while the dials 90 are turning so that each indicia on the dials 90 can be delimited. The shackle retain peg 140 positioned in the shackle retaining slot 34 of the shackle 30 and the shackle retain peg hole 20*a* of the body 20. In the locked mode, the shackle retain peg 140 will be in the shackle retaining slot 34. A bolt cover 160 is placed in the bolt covering hole 29 of the body 20 to seal the bolt hole 24 and the bolt covering hole 29. In the locked mode, the extended-fins 83 of the clutches 80 are not aligned with the correct gates 25 for each corresponding extended-fins 82, and as a result, there can be no vertical movement for the spindle 60 and the cam 50 remains in the locked position retaining the short leg shackle 31 within the body 20. The cam spring 190 exerts a force to push the cam 50 into a downward locking position, and the top 61 of the spindle 60 contacts the neck 52 of the cam 50. The small radius 42 of the bolt 40 still remains in contact the lock surface 51 of the cam 50. The big radius 41 of the bolt 40 engages the cutout 33 of the shackle 30. The short leg shackle 31 and the long leg shackle 32 will remain in the short leg shackle hole 21 and long leg shackle hole 22 of the body 20. An unauthorized user who pushes the button 70 upward will push the set of clutches 80 slightly upward in the direction of the cam 50, but will not be able open the padlock 10. The extended-fins 82 of the clutches 80 will push near the gates 25 of the body 20. The unauthorized user could then turn one or more of the dials 90 to try and locate the gates 25. However, the presence of the rounded-edges 83 or the slope 213 (FIG. 12) of the clutch 80, 210 (FIG. 12), pushes the extended-fin 82, 212 (FIG. 12) to the non-aligned gate 25 which results in the extended-fin 82, 212 (FIG. 12) sliding away from the non-aligned gate 25 which causes no feedback as to the position of the gates 25, for example, the absence of a clicking sound. If at least one extended-fin 82, 212 (FIG. 12) of at least one clutch 80, 210 (FIG. 12) of the stack of clutches 80, 210 is not aligned with the correct gate 25, then the unauthorized user cannot locate the gates 25 as the function of rounded edge 83 and slope 213 (FIG. 12) is to slide off the non-aligned gate 25. Thereby, the rounded edge 83 or slope 213 (FIG. 12) provide extra security for the padlock 10.

Figure 13A:
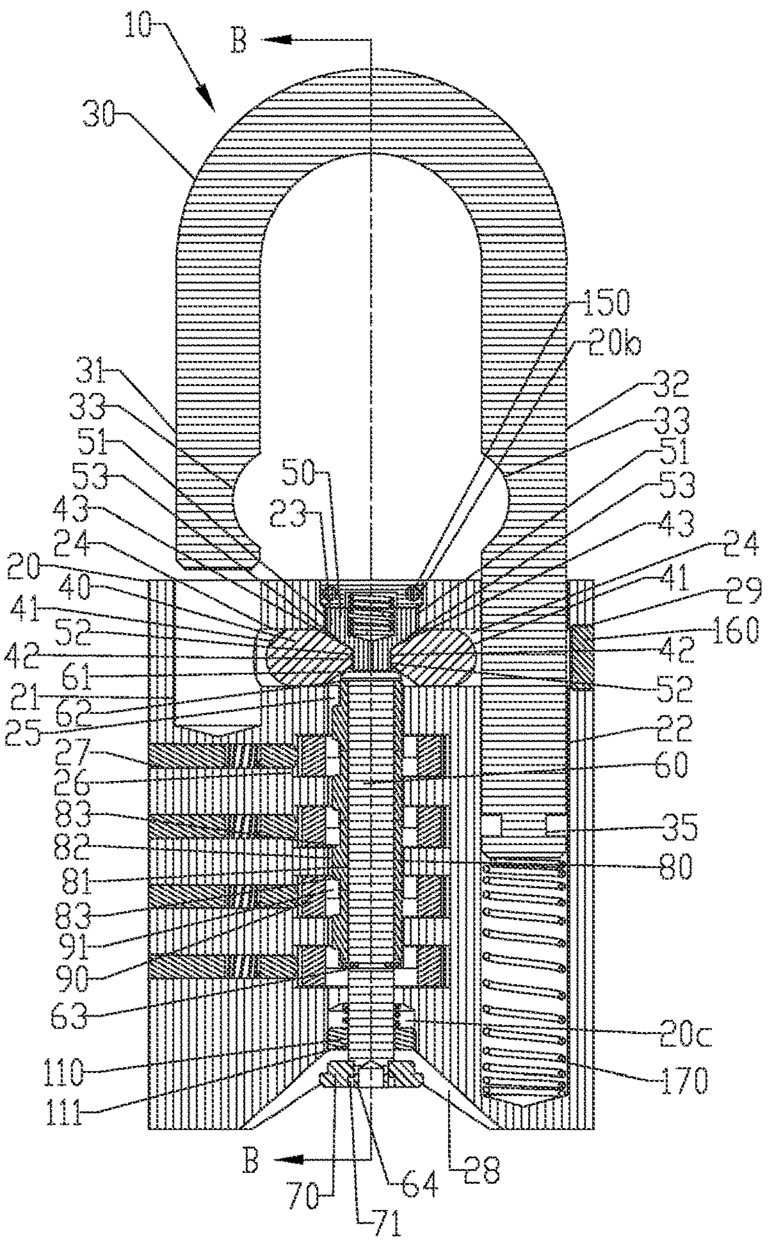
FIG. 13A is a cross-sectional view of an exemplary padlock according to an aspect of the invention in an unlocked mode taken along line A-A from FIG. 13B.
Figure 13B:
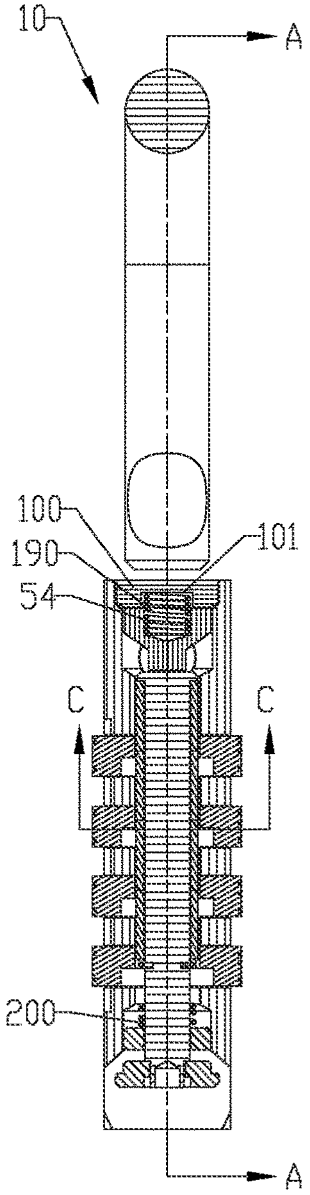
FIG. 13B is a cross-sectional view of the exemplary padlock taken along line B-B from FIG. 13A.
Figure 13C:
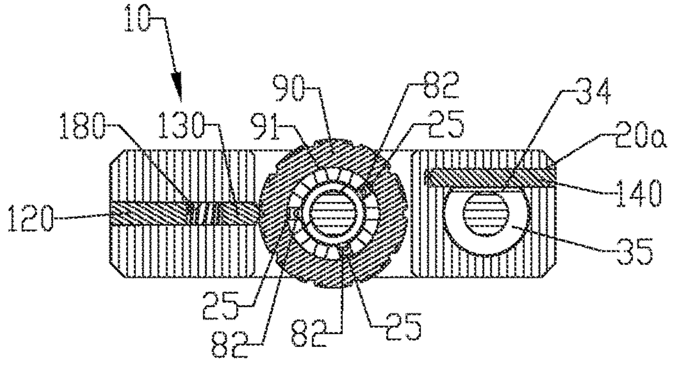
FIG. 13C is a cross-sectional view of the exemplary padlock taken along line C-C from FIG. 13B.

Referring now to FIGS. 13A-13C, the unlocked mode of the padlock 10 will now be discussed. As each dial 90 contains teeth 91 which are engaged with the extended-fins 82 of the clutches 80 such that turning the dials 90 will turn the clutches 80 in the same direction. When all of the dials 90 are positioned such that the indicia on the dials 90 display the set lock open code, then the extended-fins 82 of the clutches 80 are aligned with the correct gates 25 of the body 20. The user can now push the button 70 upward in the direction of the cam 50 and, since the clutches 80 have been sandwiched between the flat bottom 62 of the spindle 60 and the C-clip 220 positioned in the neck 63 of the spindle 60, movement of the spindle 60 in the direction of the cam 60 by the button 70 will push the clutches upward in the same manner. As the spindle 60 is pushed upward in the direction of the cam 50, the top 61 of the spindle 60 will contact the opening neck 52 of the cam 50 and move the cam 50 upward compressing the cam spring 190. As the cam 50 is being pushed upward, the opening neck 52 of the cam 50 will align with the small radius 42 of the bolt 40. In such a position, the shackle spring 170 will exert force on the long leg shackle 32 causing movement of the long leg shackle 32 out of the body 20 and pushing the big radius 41 of the bolt 40 inward as the cutouts 33 on the short leg shackle 31 and the long leg shackle 32 move away from the big radius 41 of the bolts 40. As the bolts 40 moves inward, the small radius 42 and the slope 43 of the bolts 40 will engage with the opening neck 52 and the slope 53 of the cam 50. Without the big radius 41 of the bolt 40 engaged with the cutout 33 of the short leg shackle 31, the short leg shackle 31 will move out of the short leg shackle hole 21 of the body 20. The shackle retain peg 140 will hold the shackle 30 in place as the retain peg 140 will now engage with the neck 35 of the shackle 30 in the unlocked mode. The engagement between the retain peg 140 and the neck 35 of the shackle 30 allows for the shackle 30 to rotate about the longitudinal axis of the long leg shackle 32 within the body 20 of the padlock 10. The cam 50 is retained in the unlocked position due to engagement of the big radius 41 with the long leg shackle 32, and engagement the slope 43 and slope 53 without any substantial space for each surface to separate from one another. The extended-fins 82 of the clutches 80 will engage at least a portion to the gates 25 of the body 20, and at least a portion of the extended-fins 82 remains engaged with the teeth 91 of the dials 90. In this configuration, the dials 90 are unable to rotate about the spindle 60 during the unlocked mode. This engagement prevents loss of the correct lock open code when the padlock 10 is in the unlocked mode.

Still referring to FIGS. 13A-13C, in order to relock the padlock 10 and move the padlock 10 from the unlocked mode to the locked mode, the short leg shackle 31 may be pushed into the short leg shackle hole 21 of the body 20 so that the cutout 33 of the shackle 30 aligns with the big radius 41 of the bolt 40. In this configuration, the cam spring 190 will exert a force to push the cam 50 downward, because the slope 53 of the cam 50 pushes the slope 43 of the bolt 40 outward which causes the small radius 42 of the bolt 40 to move away from the neck 52 of the cam 50. The bolt 40 will continue to move until the big radius 41 of the bolt 40 fully engages with the cutout 33 of the shackle 30. The small radius 42 of the bolt 40 will then be in contact with the lock surface 51 of the cam 50. The cam 50 will also push the clutches 80 and spindle 60 downward until the extended-fins 82 of the clutches 80 move away from the gates 25 of the body 20. As the extended-fins 82 move away from the gates 25, the user can scramble the dials 90 so that the correct lock open code is no longer positioned on the dials 90 in order to relock the padlock 10. The scrambling of the dials 90 also results in moving the extended-fins 82 away from the corresponding gates 25 due to the interconnection of the dials 90 with the clutches 80, such that the spindle 60 can no longer be pushed in a direction towards the cam 50.

Figure 14A:
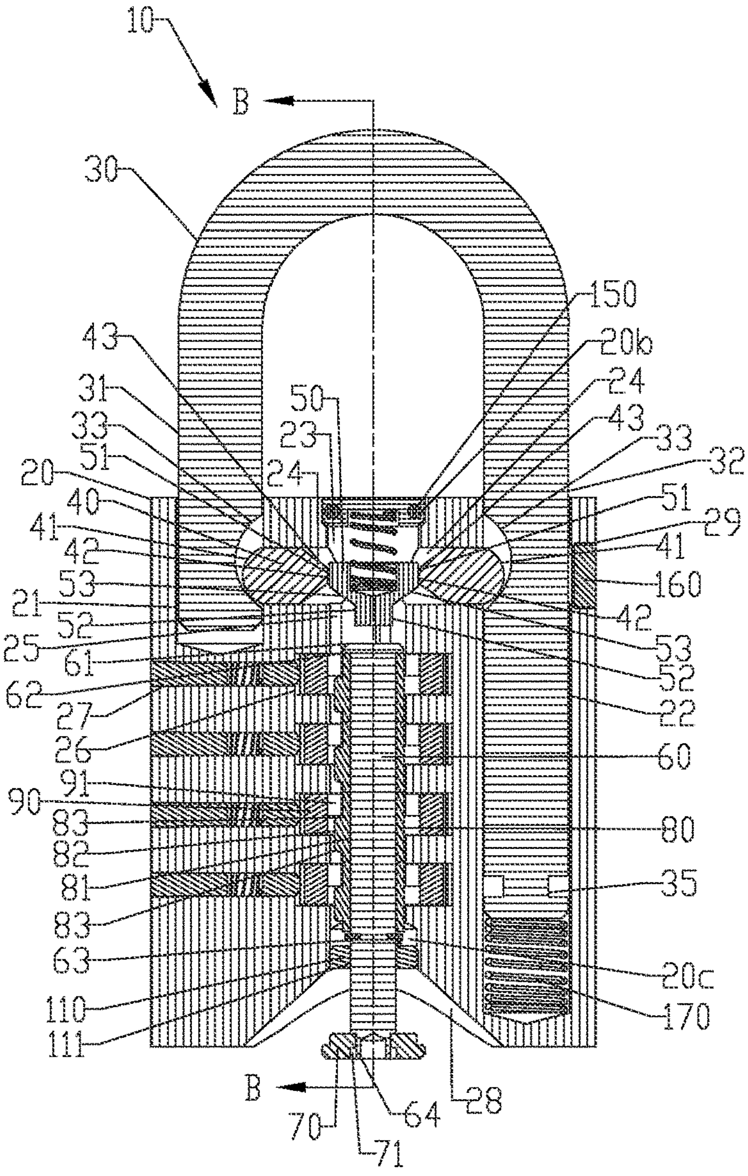
FIG. 14A is a cross-sectional view of an exemplary padlock according to an aspect of the invention in a reset mode taken along line A-A from FIG. 14B.
Figure 14B:
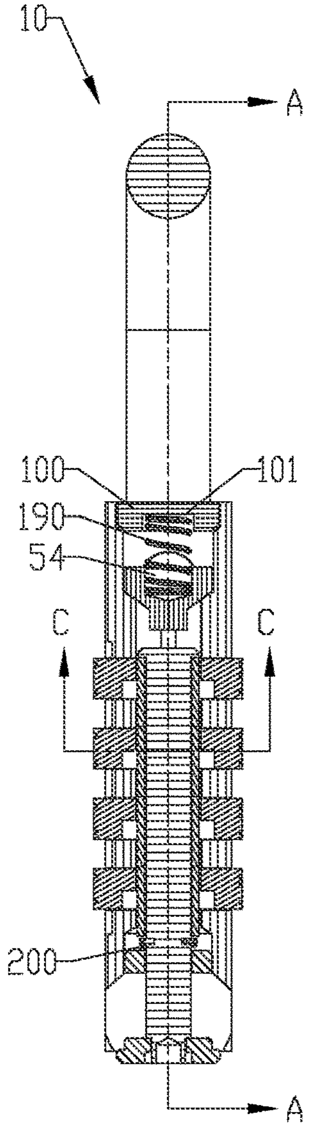
FIG. 14B is a cross-sectional view of the exemplary padlock taken along line B-B from FIG. 14A.
Figure 14C:
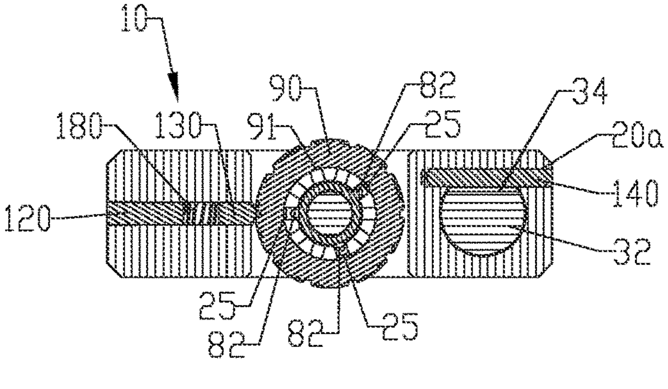
FIG. 14C is a cross-sectional view of the exemplary padlock taken along line C-C from FIG. 14B.

Referring now to FIGS. 14A-14C, an exemplary method by which the correct lock open code of the padlock 10 may be reset will be discussed. Resetting of the correct lock open code can be done when all dials 90 align to the correct lock open code so that the extended-fins 82 of the clutches 80 are aligned to the gate 25 of the body 20. The user can pull the button 70 downward in a direction away from the body 20 such that the extended-fins 82 of the clutches 80 will enter into the gates 25. As the clutches 80 are pulled downward, the extended-fins 82 will disengage from the teeth 91 of the dials 90. As a result of this disengagement, the clutches 80 will no longer have rotational movement from the dials 90 imparted to the clutches 80 as the dials 90 rotate. The user can then turn the dials 90 to set a new correct lock open code. After setting the new correct lock open code, the user can release button 70. The reset spring 200 pushes the C-clip 220 and the clutches 80 upward. As the clutches 80 move upward, the extended-fins 82 will move away from the gates 25 and the extended-fins 82 will engage back to the teeth 91 of the dial 90. The new lock open code has then been set.

Referring now to FIGS. 15A-15B, an alternative embodiment of the bolt 80 is therein illustrated by which a dual radius bolt is formed by dividing bolt 80 into two pieces, that is, to have a secondary big (larger) radius bolt 230 and a secondary slope bolt 240. The mate surfaces 232 and 243 are the surfaces which the bolts 230/240 will mate and never be separated once assembled. The secondary big (larger) radius bolt 230 contains a big radius 231 which has the same functionality as the big radius 41 of the bolt 40. The secondary slope bolt 240 contains a small radius 241 which performs the same function as the small radius 42 of bolt 40. The secondary slope bolt 240 further contains a slope 242 which has a similar function as the slope 43 of bolt 40.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A padlock comprising:

a body having at least one dial slot and at least one gate formed in the body and positioned adjacent to the at least one dial slot;

a shackle having a long leg and a short leg, wherein at least the long leg or the short leg comprises a cutout formed therein;

a bolt positioned within the body and configured for engagement with the cutout;

at least one clutch disposed within the body, and each of the at least one clutch having at least one extended-fin; and a spindle extending through each of the at least one clutch;

wherein each of the at least one extended-fin has a corresponding gate of the at least one gate so that alignment of each of the at least one extended-fin with the corresponding gate allows for rectilinear movement within the body of each of the at least one extended-fin into the corresponding gate;

wherein the padlock is positionable between a locked mode in which the short leg of the shackle is positioned within the body and the bolt is engaged with the cutout, and an unlocked mode in which the short leg of the shackle is spaced apart from the body and the bolt is disengaged from the cutout;

wherein each of the at least one clutch is configured for rotation about the spindle when the padlock is in the locked mode;

wherein each of the at least one extended-fin comprises a pair of substantially parallel sides and an upper surface and a lower surface positioned adjacent to the parallel sides, and wherein the upper surface and lower surface intersect with each of the parallel sides at angles less than or greater than 90 degrees; and wherein at least one of the upper surface and the lower surface of at least one of the at least one extended-fin comprises a rounded edge.

2. The padlock according to claim 1, further comprising:

a dial operatively connected to each of the at least one clutch, wherein each of the dials comprise teeth configured for engagement with the at least one extended-fin of each of the at least one clutch so that rotation of the dial is transferred to rotation of the at least one clutch about the spindle;

a cam operatively coupled to the spindle such that movement of the spindle is transferred to the cam;

wherein the padlock is positionable between a locked mode in which the short leg of the shackle is positioned within the body and the bolt is engaged with the cutout, and an unlocked mode in which the short leg of the shackle is spaced apart from the body and the bolt is disengaged from the cutout.

3. The padlock according to claim 2, wherein each of the dials comprises one or more indicia visible thereon, and the padlock is configured to be positioned in the unlocked mode when a preset correct lock open code comprised of one indicia from each of the dials is aligned on all of the dials.

4. The padlock according to claim 3, wherein when the padlock is positioned in the unlocked mode the spindle is configured for rectilinear movement within the body away from the cam disengaging each of the at least one extended-fin from the corresponding teeth of each of the dial to position the padlock in a reset mode;

wherein in the reset mode rotational movement of each dial is not transferred to rotational movement of the corresponding clutch; and wherein a new correct lock open code comprised of one indicia from each of the dials can be aligned the dials.

5. The padlock according to claim 2, wherein the spindle comprises a top, and the cam comprises a lock surface, an opening neck and a cam slope connecting the lock surface with the opening neck, wherein a cam spring biases the cam in a direction towards the top of the spindle.

6. The padlock according to claim 5, wherein the bolt comprises a first radius configured for engagement with the cutout of the shackle, and a second radius smaller than the first radius and configured for engagement with the lock surface of the cam.

7. The padlock according to claim 6, wherein the bolt further comprises a bolt slope positioned between the second radius and the first radius and configured for engagement with the cam slope during movement of the padlock between the unlocked mode and the locked mode.

8. The padlock according to claim 6, wherein movement of the bolt between the locked mode and unlocked mode of the padlock is substantially perpendicular to movement of the cam between the locked mode and unlocked mode of the padlock.

9. The padlock according to claim 5, wherein the spindle further comprises a button affixed to an end of the spindle opposite the top and positioned outside of the body of the padlock;

wherein movement of the button in a direction towards the body of the padlock compresses the cam spring in the unlocked mode of the padlock.

10. The padlock according to claim 5, further comprising a cam plug fit into the body of the padlock and configured to position the cam spring between the cam and the cam plug.

11. The padlock according to claim 10, further comprising at least one cam plug retainer peg positioned in the cam plug and the body and configured to retain the cam plug in the body of the padlock.

12. The padlock according to claim 2, wherein when each of the at least one extended-fin has been moved into the corresponding gate for each of the at least one extended-fin, the engagement of each of the at least one extended-fin with the corresponding gate inhibits rotation of the at least one clutch about the spindle and rotation of each dial as a result of engagement between the teeth of the dial and the corresponding extended-fins.

13. The padlock according to claim 1, wherein at least one of the upper surface and the lower surface of at least one of the at least one extended-fin comprises a slope.

14. The padlock according to claim 1, wherein each of the at least one clutch comprises three extended-fins, and the three extended-fins are positioned about each of the at least one clutch such that no more than one extended-fin is aligned with the at least one gate unless all of the three extended-fins are aligned with the corresponding gate for each of the three extended-fins.

15. The padlock according to claim 1, wherein the bolt comprises a first portion having a first radius and a second portion having a second radius, and wherein the first portion is configured to be mated with the second portion to form the bolt.

16. The padlock according to claim 15, wherein the first portion and the second portion of the bolt are movable relative to each other when disposed within the body of the padlock.

17. The padlock according to claim 1, wherein each of the short leg and the long leg of the shackle comprise a cutout formed therein, and the padlock further comprises a second bolt positioned in the body and configured for engagement with the cutout formed on the short leg or the cutout formed on the long leg.

* * * * *